United States Patent Office 3,086,041
Patented Apr. 16, 1963

3,086,041
PRODUCTION OF ALIPHATIC NITRILES FROM OLEFINS
David James Hadley, Epsom Downs, and David Gordon Stewart, Epsom, England, assignors to The Distillers Company Limited, Edinburgh, Scotland, a British company
No Drawing. Filed Mar. 24, 1959, Ser. No. 801,453
Claims priority, application Great Britain Apr. 16, 1958
6 Claims. (Cl. 260—465.3)

The present invention relates to the production of organic compounds and in particular to the production of aliphatic nitriles from olefins.

It is known that olefins may be oxidised in the vapour phase in the presence of a suitable catalyst to unsaturated aldehydes; propylene, for example, may be catalytically oxidised to acrolein. It is also known that unsaturated aldehydes may be converted into unsaturated aliphatic nitriles by reaction with ammonia and oxygen in the presence of a catalyst; acrolein, for example, may be converted into acrylonitrile.

It is an object of the present invention to provide an improved process of producing unsaturated aliphatic nitriles from olefins, in which the conversion of the olefin into the nitrile is effected in one operation.

According to the present invention, the process of producing an unsaturated aliphatic nitrile comprises heating a mixture of an olefin having the formula

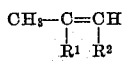

wherein $R^1$ and $R^2$ represent hydrogen atoms or alkyl radicals containing from 1 to 6 carbon atoms, with molecular oxygen, ammonia and steam in the vapour phase at an elevated temperature in the presence of a molybdenum compound as catalyst.

The olefin used as the starting material in the invention is preferably propylene, the unsaturated aliphatic nitrile produced being acrylonitrile. Other olefins may, however, also be used as starting material.

The proportions of the olefin, molecular oxygen, ammonia and steam in the mixture can be selected from a wide range. The proportion of the olefin in the mixture heated is preferably from 1% to 20% by volume. The proportion of molecular oxygen in the mixture heated is preferably from 2% to 10% by volume. The molecular oxygen used may be in the form of oxygen or of oxygen diluted with an inert diluent such as nitrogen or carbon dioxide; air, a mixture of air and oxygen or a mixture of air with further inert diluent, may conveniently be used. The proportion of ammonia in the mixture heated is preferably from 1% to 10% by volume. The proportion of steam in the mixture heated is preferably from 20% to 90% by volume, a proportion from 40% to 60% by volume being particularly preferred.

While any mixture of olefin, molecular oxygen, ammonia and steam selected from the limits given in the preceding paragraph may be heated in accordance with the invention to produce an unsaturated aliphatic nitrile, certain of these mixtures are explosive. An explosion is particularly possible if a proportion of molecular oxygen greater than 10% by volume is present in the mixture, and it is therefore preferred to use a proportion of molecular oxygen not greater than 10% by volume. The explosion risk is believed to be dependent also on the particular proportions of olefin, ammonia and steam used, as well as the temperature at which the mixture is maintained, and if it is desired to employ a proportion of molecular oxygen greater than 10% by volume, it is preferred to exclude proportions of the olefin between 2 and 10% by volume.

The mixture of the olefin, ammonia, molecular oxygen and steam is heated at an elevated temperature in the presence of molybdenum compound as catalyst, preferably at a temperature between 300° to 600° C.

The catalyst of the invention is preferably molybdenum oxide supported on a carrier; the carrier may be, for example, silica gel, kieselguhr or alumina. The efficiency of the catalyst may be increased by pretreating the supporting material before the molybdenum oxide is deposited on it, for example by heating it to an elevated temperature or by impregnating it with an inorganic compound as promoter. The catalyst, as well as containing molybdenum oxide, may also contain compounds of other elements. Preferably the catalyst is molybdenum oxide supported on alumina which has been activated by being steeped in a solution of an alkali metal compound so as to impregnate it with the alkali metal compound, dried, heated to a temperature between 1000° and 1500° C. and subsequently cooled. The proportion of the alkali metal compound present in the catalyst is preferably from 1% to 10% by weight if the alkali metal is sodium and from 1% to 20% by weight if the alkali metal is potassium. The alkali metal compound used is preferably a hydroxide, chloride, sulphate, carbonate, aluminate, nitrate, phosphate or molybdate of sodium or potassium.

The unsaturated aliphatic nitrile may be recovered from the reaction product by extracting the unsaturated nitrile into water or some other solvent and separating the unsaturated nitrile from the resulting mixture by fractional distillation. Hydrogen cyanide, which may be a by-product of the reaction, may be extracted with the unsaturated nitrile and then separated from the desired unsaturated nitrile.

The process of the invention is preferably carried out by placing the catalyst in a reactor, heating the reactor at a temperature between 300° and 600° C. and passing the mixture of the olefin, molecular oxygen, ammonia and steam through the reactor and over the catalyst. The mixture may, for instance, be passed in a straight run through the reactor and the unsaturated aliphatic nitrile produced recovered from the reaction product. In one method of operation, unconverted olefin may be removed from the reaction production by extraction with an oil and returned to the reactor. In a further method of operation, part of the reaction product, consisting mainly of the desired unsaturated aliphatic nitrile, carbon dioxide and any unconverted olefin, molecular oxygen, ammonia or steam, may be recycled to the reactor, together with fresh quantities of the olefin, molecular oxygen, ammonia and steam.

This method of operation may, for example, be carried out by venting a portion of the reaction product leaving the reactor, recovering aliphatic nitrile and olefin from this portion and recycling the whole of the remainder. The method may also be carried out by extracting the unsaturated aliphatic nitrile from the reaction product with water as an aqueous medium, then washing the remainder of the product with alkali to remove carbon dioxide which is formed as a by-product, and recycling the remainder of the reaction product to the reactor together with fresh olefin, molecular oxygen, ammonia or steam.

If the process of the invention is operated by recycling part of the reaction product to the reactor, together with fresh olefin, molecular oxygen, ammonia and steam, the composition of the mixture fed in and the ratio of the recycled or returned gas to vented gas may be varied to give any desired composition of gas entering the reactor. From the vented gas, part or all of the unconverted olefin may be recovered. If a recycle system is used, a vent is preferably provided to avoid accumulation of inert gases such as carbon monoxide or nitrogen which may be produced in small quantities in the reactor or be introduced with the feed.

If it is desired to use an inert diluting gas in the mixture of the olefin, molecular oxygen, ammonia and steam heated in the presence of the catalyst, this may be carbon dioxide, and, if the process of the invention is carried out continuously, part or all of the carbon dioxide used as diluting gas may be that produced as a by-product of the oxidation of the olefin.

The following examples illustrate further the present invention. Parts by weight shown therein bear the same relation to parts by volume as do kilograms to litres.

*Example 1*

98 parts by weight of alumina (8 to 16 mesh British standard sieve) were steeped at 18° C. in a solution of 2 parts by weight of sodium hydroxide in 78 parts by weight of water. The mixture was dried at 80° C. with frequent stirring. When dry, the alumina was heated for 22 hours at 1050° C. and then cooled.

77 parts by weight of this treated alumina were then steeped in a solution of 28.2 parts by weight of ammonium molybdate, $(NH_4)_6Mo_7O_{24} \cdot 4H_2O$, dissolved in a mixture of 47 parts by weight of water and 10.6 parts by weight of concentrated aqueous ammonia solution (specific gravity 0.88) maintained at 80° C. The resulting material was dried at 80° C. with frequent stirring and then heated at 380° C., in a stream of air to decompose the ammonium molybdate deposited on the alumina to molybdenum trioxide.

The catalyst was placed in a tube reactor which was then maintained at 480° C. A mixture consisting of 11.1% by volume of propylene, 26.9% by volume of air, 3.5% by volume of ammonia and 58.5% by volume of steam was passed through the reactor, the contact time being 3.2 seconds. Acrylonitrile was produced and was recovered by extracting it with water from the reaction product emerging from the reactor, and subjecting the aqueous extract to fractional distillation.

Of the propylene fed to the reactor 8.1% was converted to acrylonitrile and 2.5% to carbon dioxide.

*Example 2*

The catalyst prepared by the procedure described in Example 1 was placed in a tube reactor which was then maintained at 480° C. A mixture consisting of 12% by volume of propylene, 10% by volume of oxygen, 35% by volume of nitrogen, 4% by volume of ammonia and 39% by volume of steam was passed through the reactor, the contact time being 4 seconds.

10% of the propylene fed to the reactor was converted to acrylonitrile.

As a contrast to the present invention, the procedure of Example 2 was carried out under the same conditions and with the same mixture except that 74% by volume of nitrogen was present and no steam. The yield of acrylonitrile was only 3%.

We claim:
1. A process which comprises bringing a mixed stream of propylene, molecular oxygen, ammonia and steam into contact with molybdenum oxide as catalyst supported on a carrier containing an alkali metal compound selected from the group consisting of (a) the hydroxide, chloride, sulphate, carbonate, nitrate and molybdate of sodium, and (b) potassium compounds corresponding to the sodium compounds in group (a) as a promoter, while maintaining the temperature thereof at about 300 to 600° C., the proportionate volumes of the ingredients, based on the total volume of the mixed stream, being as follows: 1 to 20% propylene, 1 to 10% ammonia, 20 to 90% steam, and at least 2% oxygen, to produce acrylonitrile.

2. The process claimed in claim 1 wherein the proportion of molecular oxygen in the mixture is from 2% to 10% by volume based on the total volume of the mixture heated.

3. The process claimed in claim 1 wherein the catalyst is molybdenum trioxide supported on a carrier.

4. The process claimed in claim 1 wherein the carrier is selected from the group consisting of silica gel, kieselguhr and alumina.

5. The process claimed in claim 1 wherein the catalyst contains from 1% to 10% by weight of the alkali metal compound, the alkali metal being sodium.

6. The process claimed in claim 1 wherein the catalyst contains from 1% to 20% by weight of the alkali metal compound, the alkali metal being potassium.

References Cited in the file of this patent

UNITED STATES PATENTS

| | | |
|---|---|---|
| 2,381,472 | Teter | Aug. 7, 1945 |
| 2,479,879 | Teter | Aug. 23, 1949 |
| 2,481,826 | Cosby | Sept. 13, 1949 |
| 2,904,580 | Idol | Sept. 15, 1959 |